(12) United States Patent
Shibata

(10) Patent No.: US 11,565,572 B2
(45) Date of Patent: Jan. 31, 2023

(54) DEVICE AND METHOD OF CONTROLLING STARTING OF VEHICLE DEVICES

(71) Applicant: HONDA MOTOR CO., LTD., Tokyo (JP)

(72) Inventor: Naoki Shibata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1010 days.

(21) Appl. No.: 16/286,779

(22) Filed: Feb. 27, 2019

(65) Prior Publication Data

US 2019/0283532 A1    Sep. 19, 2019

(30) Foreign Application Priority Data

Mar. 19, 2018    (JP) .............................. JP2018-051147

(51) Int. Cl.
*B60H 1/00* (2006.01)
*B60W 10/30* (2006.01)

(52) U.S. Cl.
CPC .......... *B60H 1/00778* (2013.01); *B60W 10/30* (2013.01); *B60H 1/00814* (2013.01)

(58) Field of Classification Search
CPC .......... B60H 1/00778; B60H 1/00814; B60W 10/30
USPC ......................................................... 701/36
See application file for complete search history.

(56) References Cited

U.S. PATENT DOCUMENTS

| | | | | |
|---|---|---|---|---|
| 4,172,555 A * | 10/1979 | Levine | ............... | G05D 23/1904 236/47 |
| 9,494,360 B2 | 11/2016 | Tsunoda et al. | | |
| 9,975,472 B2 * | 5/2018 | Wadell | ................. | B60Q 1/0094 |
| 10,394,251 B2 * | 8/2019 | Dierker | ................... | B60L 53/65 |
| 10,759,300 B2 * | 9/2020 | Yi | ........................... | B60L 58/20 |
| 10,843,524 B2 * | 11/2020 | Li | ...................... | B60H 1/00657 |
| 10,895,235 B2 * | 1/2021 | King | ................... | F02N 11/0818 |
| 11,001,231 B1 * | 5/2021 | Hedman | ............. | B60R 16/0237 |
| 2006/0149459 A1 * | 7/2006 | Matsuura | .......... | G01C 21/3484 701/540 |
| 2010/0097036 A1 * | 4/2010 | Wakayama | ............. | B60L 50/51 320/157 |
| 2011/0172880 A1 * | 7/2011 | Tamura | .............. | B60H 1/00771 701/36 |

(Continued)

FOREIGN PATENT DOCUMENTS

| | | |
|---|---|---|
| CN | 102442262 A | 5/2012 |
| CN | 103423928 A | 12/2013 |

(Continued)

OTHER PUBLICATIONS

Chinese Office Action issued for Chinese Patent Application No. 201910148967.7 dated Mar. 30, 2022 (with Partial Translation).

*Primary Examiner* — Richard A Goldman
(74) *Attorney, Agent, or Firm* — Thomas | Horstemeyer, LLP

(57) ABSTRACT

A control device for controlling a device provided in a vehicle is provided. The device includes a starting unit capable of starting the device, an identification unit configured to identify a place of stay where an occupant of the vehicle spends time after getting out of the vehicle, an estimation unit configured to estimate a stay period of the occupant at the place of stay, and a determination unit configured to determine, based on the stay period, a scheduled time at which the starting unit is to start the device before the occupant gets into the vehicle.

11 Claims, 4 Drawing Sheets

(56) References Cited

U.S. PATENT DOCUMENTS

| | | | |
|---|---|---|---|
| 2012/0011122 A1* | 1/2012 | Sakuma | G06Q 10/063 |
| | | | 707/E17.046 |
| 2012/0080178 A1 | 4/2012 | Scholl | |
| 2012/0091958 A1* | 4/2012 | Ichikawa | B60L 3/0069 |
| | | | 320/109 |
| 2013/0268125 A1* | 10/2013 | Matsuoka | F24F 11/30 |
| | | | 700/276 |
| 2013/0305759 A1 | 11/2013 | Tsunoda et al. | |
| 2014/0163777 A1* | 6/2014 | Yashiro | B60L 53/64 |
| | | | 701/2 |
| 2014/0207282 A1* | 7/2014 | Angle | H04W 4/30 |
| | | | 901/1 |
| 2014/0379174 A1* | 12/2014 | Holub | B60R 16/033 |
| | | | 701/2 |
| 2016/0138305 A1* | 5/2016 | Noguchi | E05B 81/58 |
| | | | 70/263 |
| 2016/0288621 A1* | 10/2016 | Sakane | B60H 1/2218 |
| 2017/0050527 A1* | 2/2017 | Tsuchiya | B60L 53/14 |
| 2017/0120888 A1 | 5/2017 | Jinno | |
| 2017/0210390 A1* | 7/2017 | Porras | B60W 50/0097 |
| 2017/0279957 A1* | 9/2017 | Abramson et al. | H04M 1/6075 |
| 2018/0186382 A1* | 7/2018 | Le Cam | B60W 20/10 |
| 2019/0118616 A1* | 4/2019 | Morita | G06Q 50/30 |
| 2019/0256125 A1* | 8/2019 | Ostrowski | B62D 1/06 |
| 2019/0283532 A1* | 9/2019 | Shibata | B60H 1/00778 |
| 2020/0086849 A1* | 3/2020 | Colavincenzo | B60K 25/02 |
| 2020/0122549 A1* | 4/2020 | Seki | B60W 40/08 |
| 2020/0223284 A1* | 7/2020 | Hoshino | B60H 1/0073 |
| 2020/0282802 A1* | 9/2020 | Inokuchi | B60H 1/00735 |
| 2020/0307352 A1* | 10/2020 | Boston | B60H 1/00764 |
| 2021/0359516 A1* | 11/2021 | Hatamosa | H02J 3/144 |
| 2022/0063371 A1* | 3/2022 | Michalowski | F21S 41/28 |
| 2022/0176968 A1* | 6/2022 | Brooks | G06Q 10/06395 |

FOREIGN PATENT DOCUMENTS

| | | |
|---|---|---|
| CN | 104842743 A | 8/2015 |
| CN | 106891884 A | 6/2017 |
| GB | 2395988 B | 8/2006 |
| JP | 2004176654 A | 6/2004 |
| JP | 2009-113674 A | 5/2009 |
| JP | 2011057180 A | 3/2011 |

\* cited by examiner

DEVICE AND METHOD OF CONTROLLING STARTING OF VEHICLE DEVICES

CROSS-REFERENCE TO RELATED APPLICATION(S)

This application claims priority to and the benefit of Japanese Patent Application No. 2018-051147 filed on Mar. 19, 2018, the entire disclosure of which is incorporated herein by reference.

BACKGROUND OF THE INVENTION

Field of the Invention

The present invention relates to a control device and a control method.

Description of the Related Art

A technique (so-called pre-air conditioning) is proposed that starts air conditioning of the interior of a vehicle while it is parked so that the air conditioning state in the vehicle is a desired state when a person gets into the vehicle. Japanese Patent Laid-Open No. 2009-113674 describes a technique that determines whether or not pre-air conditioning can be performed and informs an occupant of a vehicle of a determination result before the occupant gets out of the vehicle.

SUMMARY OF THE INVENTION

According to the technique described in Japanese Patent Laid-Open No. 2009-113674, the occupant voluntarily gives an instruction to start pre-air conditioning. As a matter of course, pre-air conditioning is not started when the occupant forgets to give the instruction to start pre-air conditioning. A device that is desired to be started in advance is not limited to an air conditioning device. An aspect of the present invention provides a technique that is advantageous for starting a device provided in a vehicle.

According to an embodiment of the present invention, a control device that controls for controlling a device provided in a vehicle, comprising: a starting unit capable of starting the device; an identification unit configured to identify a place of stay where an occupant of the vehicle spends time after getting out of the vehicle; an estimation unit configured to estimate a stay period of the occupant at the place of stay; and a determination unit configured to determine, based on the stay period, a scheduled time at which the starting unit is to start the device before the occupant gets into the vehicle is provided.

DESCRIPTION OF THE EMBODIMENTS

The following describes embodiments of the present invention with reference to the accompanying drawings. Similar elements in different embodiments are denoted with the same reference sign, and a redundant description thereof is omitted. The embodiments can be altered or combined as appropriate. In the following embodiment, the present invention is applied to a vehicle provided with an air conditioning device. A four-wheel drive vehicle is described as an example of such a vehicle.

Figure 1:
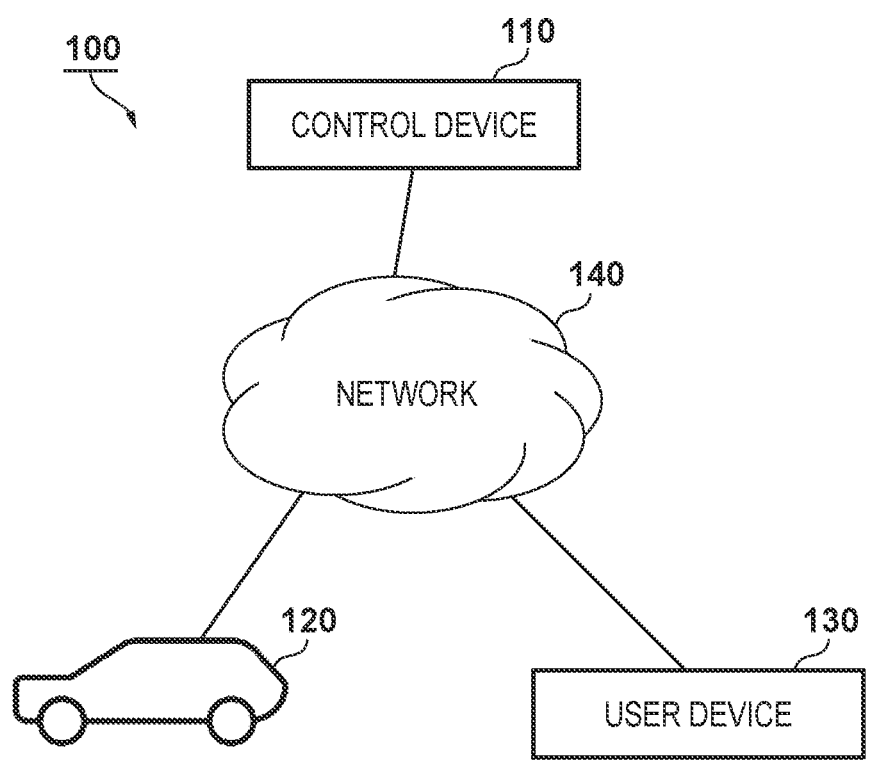
FIG. 1 is a block diagram for explaining an example of a configuration of an air conditioning control system according to an embodiment.

The following describes an example of a configuration of an air conditioning control system 100 according to an embodiment with reference to FIG. 1. The air conditioning control system 100 includes a control device 110, a vehicle 120, and a user device 130. The control device 110, the vehicle 120, and the user device 130 can communicate with each other via a network 140. The network 140 may be, for example, a public network such as the Internet or a private network.

The air conditioning control system 100 provides an air conditioning control service. The air conditioning control service is a service that controls an air conditioning device (for example, an air conditioner) of the vehicle 120 that is a service target. Specifically, in the air conditioning control service of the present embodiment, the air conditioning device is started before an occupant (for example, a driver or a passenger) of the vehicle 120 gets into the vehicle 120. Starting the air conditioning device as above is sometimes called pre-air conditioning. The pre-air conditioning enables the occupant to get into the vehicle 120 at a comfortable cabin temperature. The number of occupants of the vehicle 120 may be one, or two or more.

The control device 110 performs operations to provide the air conditioning control service. For example, the air conditioning device of the vehicle 120 can be remotely started by transmitting a control signal to the air conditioning device. The operations of the control device 110 will be described later in detail.

The vehicle 120 is a vehicle that is used by a user of the air conditioning control service. The user of the air conditioning control service is, for example, an occupant of the vehicle 120. Although a single vehicle 120 is illustrated in FIG. 1, multiple vehicles can simultaneously use the air conditioning control service. The vehicle 120 may be a gasoline automobile, an electric automobile, or any other type of automobile.

The user device 130 is a device that is used by the user of the air conditioning control service. The user device 130 presents notifications received from the control device 110 to the user and transmits input made by the user to the control device 110. The user device 130 may be a mobile terminal such as a mobile phone or a smartphone. Alternatively, the user device 130 may be a device that is provided in the vehicle 120.

Figure 2:
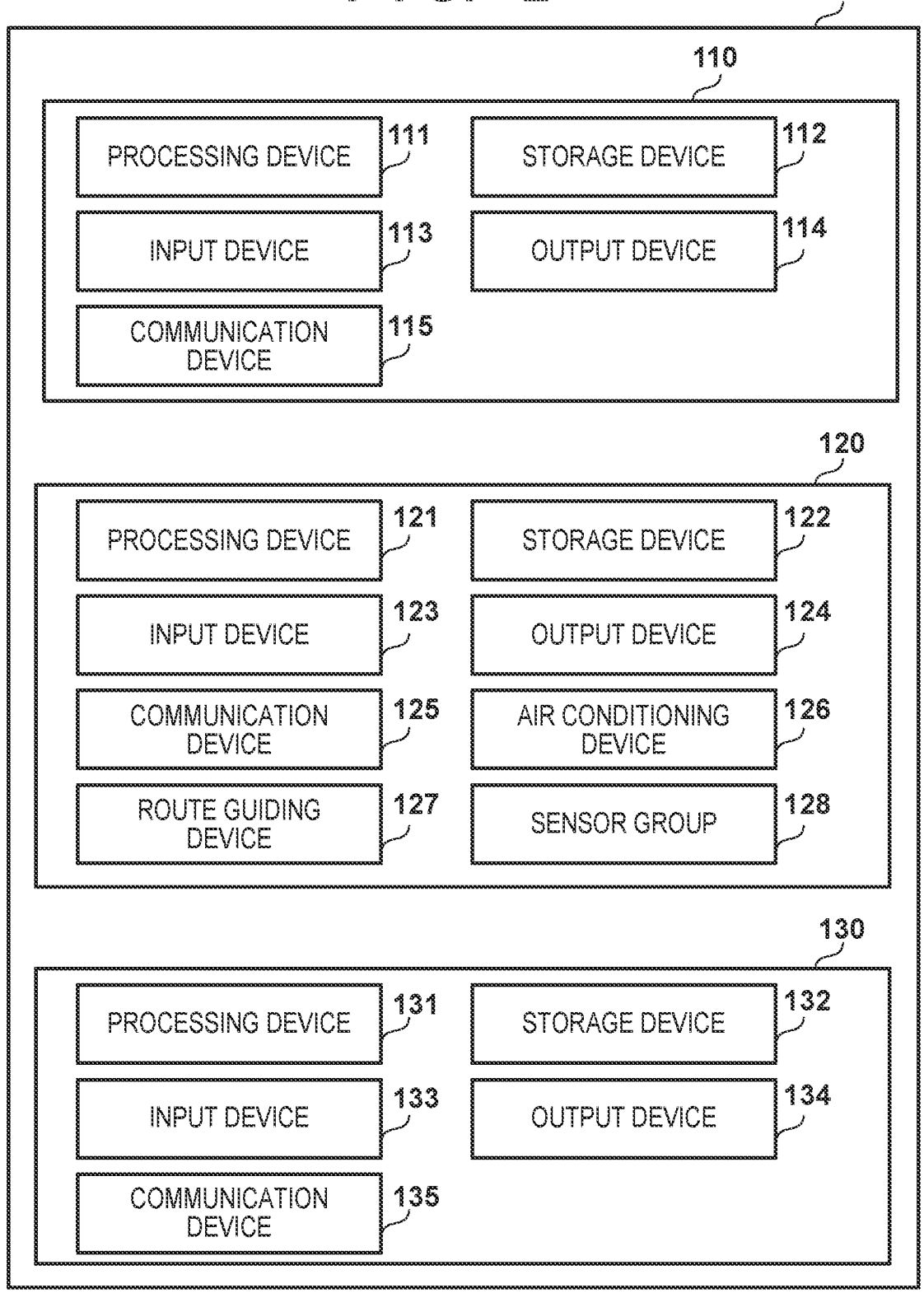
FIG. 2 is a block diagram for explaining an example of configurations of devices included in an air conditioning control system according to an embodiment.

The following describes an example of hardware configurations of the devices included in the air conditioning control system 100 with reference to FIG. 2. The control device 110 includes a processing device 111, a storage device 112, an input device 113, an output device 114, and a communication device 115. The processing device 111 is a device that executes processing performed by the control device 110 and is constituted by a processor such as a CPU, for example. The storage device 112 is a device for storing data to be used in the processing performed by the control device 110 and includes, for example, a main storage device that is constituted by a memory such as RAM and ROM and an auxiliary storage device that is constituted by a hard disk or the like. The input device 113 is a device for accepting input made by a user of the control device 110 (for example, an administrator of the air conditioning control system 100) and is constituted by a keyboard and a mouse, for example. The output device 114 is a device for presenting information to the user of the control device 110 and is constituted by a liquid crystal display or a speaker, for example. The input device 113 and the output device 114 may be constituted by an integrated device such as a touch screen. The communication device 115 is a device for connecting the control device 110 to the network 140 and is constituted by a network card or the like in the case of wired communication, or an antenna, a signal processing circuit, and the like in the case of wireless communication.

The vehicle 120 includes a processing device 121, a storage device 122, an input device 123, an output device 124, a communication device 125, an air conditioning device 126, a route guiding device 127, and a sensor group 128. FIG. 2 illustrates elements that can be used in the air conditioning control service, and other elements such as those related to travelling of the vehicle 120 are omitted. The processing device 121 is a device that executes processing performed by the vehicle 120 and is constituted by a processor such as a CPU, for example. The storage device 122 is a device for storing data to be used in the processing performed by the vehicle 120 and is constituted by a memory such as RAM and ROM, for example. The input device 123 is a device for accepting input made by the occupant of the vehicle 120 and is constituted by a touch panel or buttons, for example. The output device 124 is a device for presenting information to the occupant of the vehicle 120 and is constituted by a liquid crystal display or a speaker, for example. The input device 123 and the output device 124 may be constituted by an integrated device such as a touch screen. The communication device 125 is a device for connecting the vehicle 120 to the network 140 and is constituted by an antenna, a signal processing circuit, and the like.

The air conditioning device 126 is a device that adjusts the temperature of the interior of the vehicle 120. The route guiding device 127 is a device (so-called car navigation device) that guides the driver of the vehicle 120 along a route to a destination. The sensor group 128 includes at least one sensor for detecting the state of the occupant of the vehicle 120. The sensor group 128 includes, for example, a camera for taking an image of the occupant and a weight sensor.

The user device 130 includes a processing device 131, a storage device 132, an input device 133, an output device 134, and a communication device 135. The processing device 131 is a device that executes processing performed by the user device 130 and is constituted by a processor such as a CPU, for example. The storage device 132 is a device for storing data to be used in the processing performed by the user device 130 and is constituted by a memory such as RAM and ROM, for example. The input device 133 is a device for accepting input made by the user of the user device 130 (for example, the occupant of the vehicle 120) and is constituted by a touch panel or buttons, for example. The output device 134 is a device for presenting information to the user of the user device 130 and is constituted by a liquid crystal display or a speaker, for example. The input device 133 and the output device 134 may be constituted by an integrated device such as a touch screen. The communication device 135 is a device for connecting the user device 130 to the network 140 and is constituted by an antenna, a signal processing circuit, and the like.

In the case where the user device 130 is a device that is provided in the vehicle 120, an element of the vehicle 120 and an element of the user device 130 may be constituted by an integrated element. For example, the input device 123 of the vehicle 120 and the input device 133 of the user device 130 may be constituted by an integrated input device (single input device). In other words, the single input device can function as both the input device 123 of the vehicle 120 and the input device 133 of the user device 130.

Figure 3:
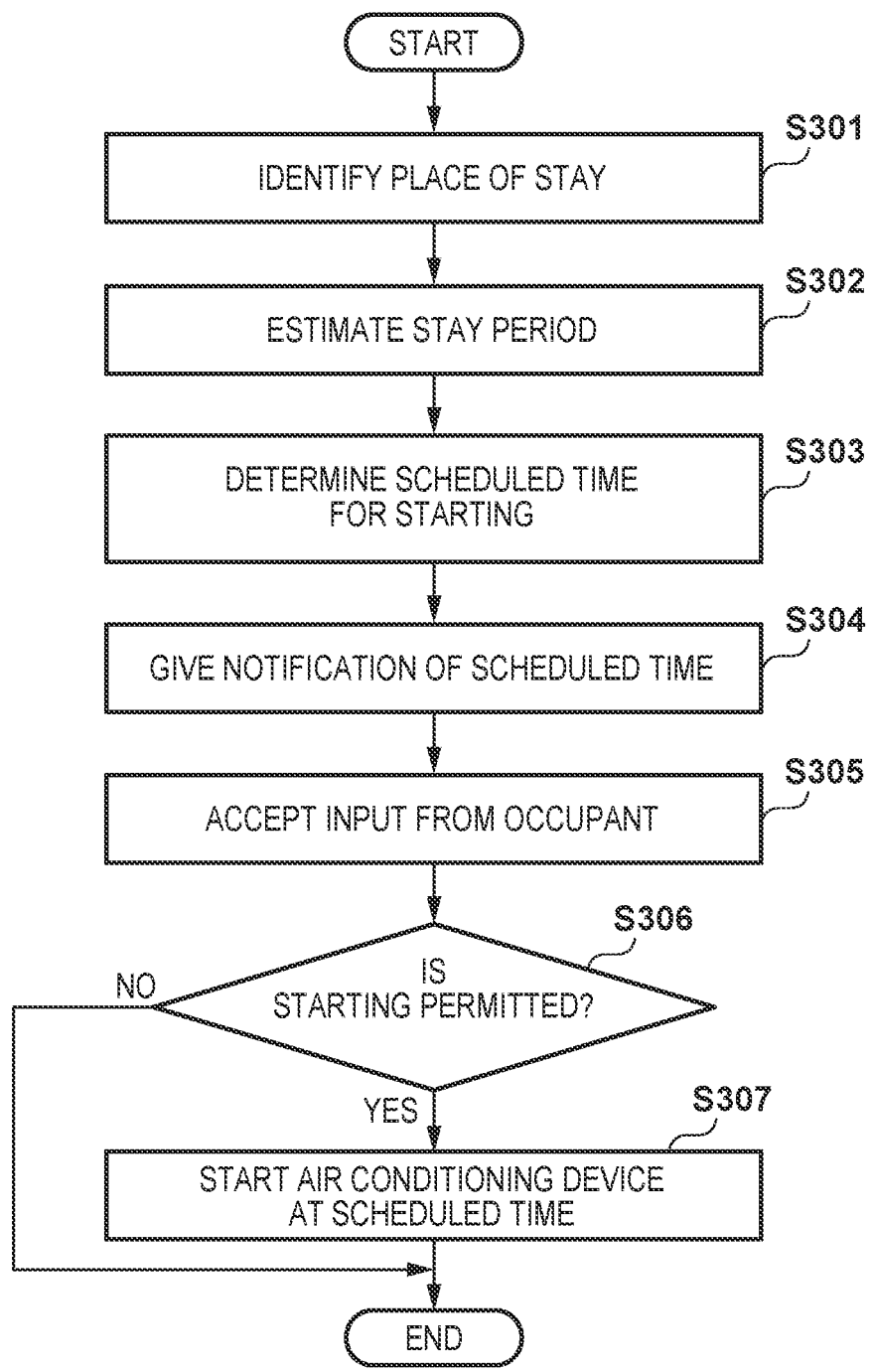
FIG. 3 is a flowchart for explaining an example of an air conditioning control method according to an embodiment.

The following describes an example of processing of the air conditioning control service with reference to FIG. 3. This processing is executed by cooperation between the control device 110, the vehicle 120, and the user device 130. In the control device 110, processing is performed by the processing device 111 that reads programs stored in the storage device 112 and executes instructions included in the programs. Similar can be said for the vehicle 120 and the user device 130. The processing of FIG. 3 is started, for example, when a destination is set in the route guiding device 127 by the occupant of the vehicle 120, when the vehicle 120 has arrived at a destination, when the occupant gets out of the vehicle 120, and/or when an instruction to start the processing is received from the occupant of the vehicle 120.

In step S301, the control device 110 identifies a place of stay where the occupant of the vehicle 120 spends time after getting out of the vehicle 120. The place of stay means a place where the occupant of the vehicle 120 spends time outside the vehicle 120, and is, for example, a commercial facility such as a shopping mall, an amusement facility such as an amusement park, or a workplace. When a destination is set in the route guiding device 127 by the occupant, the control device 110 may identify the destination as the place of stay. Alternatively, the control device 110 may identify a place where the occupant has gotten out of the vehicle 120 as the place of stay. The place where the occupant has gotten out of the vehicle 120 can be identified by using a positioning sensor that is included in the route guiding device 127, for example.

In step S302, the control device 110 estimates a stay period for which the occupant will stay at the place of stay. The stay period means a period of time from when the occupant gets out of the vehicle 120 to when the occupant gets into the vehicle 120 again. In the case where there are multiple occupants, the stay period may be a period of time from when all of the occupants get out of the vehicle 120 to when at least one occupant gets into the vehicle 120. This is because air conditioning is considered to be operating while at least one occupant stays in the vehicle. A method for estimating the stay period will be described later in detail.

In step S303, the control device 110 determines, based on the stay period estimated in step S302, a scheduled time at which the control device 110 is to start the air conditioning device 126 before the occupant again gets into the vehicle 120. The scheduled time may be determined based on the current temperature of the interior of the vehicle 120 as well. For example, when the current time is twelve o'clock, the estimated stay period is three hours, and the time required to adjust the internal temperature of the vehicle to a set temperature is ten minutes, the control device 110 determines the scheduled time to be 14:50. The set temperature is, for example, a temperature set at the point in time when the occupant got out of the vehicle 120. The time required to adjust the internal temperature of the vehicle to the set temperature depends on the difference between the current cabin temperature and the set temperature.

In step S304, the control device 110 gives a notification of the scheduled time through the output device 134 of the user device 130. In the case where the scheduled time is determined while the occupant is in the vehicle 120, the control device 110 may give the notification of the scheduled time when the scheduled time is determined, after the vehicle 120 has arrived at the place of stay and before the occupant gets out of the vehicle 120, or after the occupant gets out of the vehicle 120. In the case where the notification is given after the occupant gets out of the vehicle 120, the control device 110 may give the notification while the occupant is operating the user device 130 or just before the scheduled time.

In step S305, the control device 110 accepts input regarding the scheduled time made by the occupant to the input device 133 of the user device 130. The input may include permission or prohibition of automatic starting of the air conditioning device 126, a change to the scheduled time, or a change to the set temperature.

Figure 4:
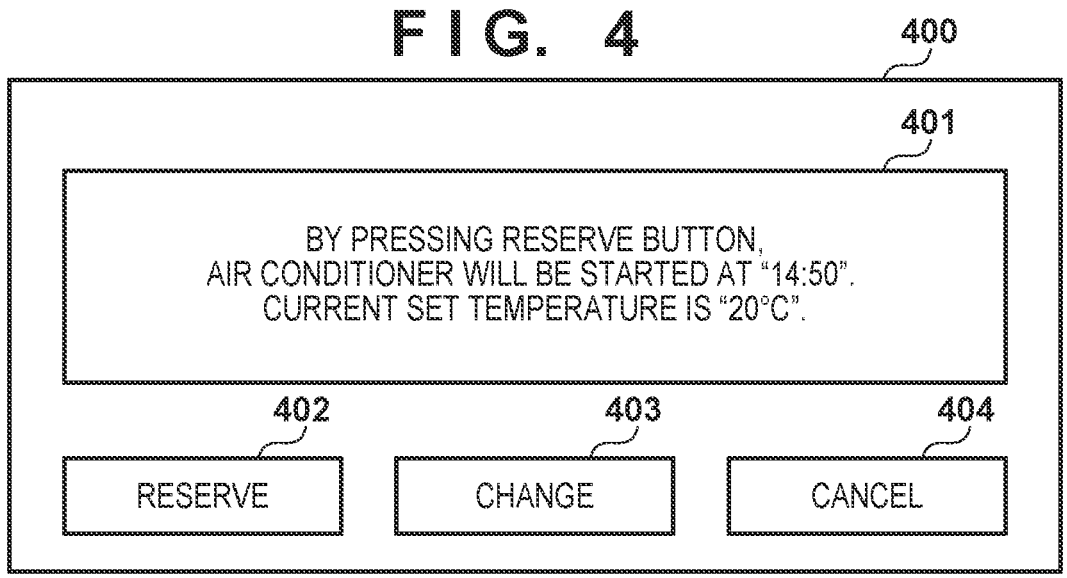
FIG. 4 is a schematic diagram for explaining a screen that exhibits a scheduled time according to an embodiment.

The following describes an example of a screen used in steps S304 and S305 with reference to FIG. 4. A screen 400 is displayed by the output device 134 of the user device 130. Information regarding the scheduled time and the set temperature is displayed in a display area 401. The information may be provided by using audio sound in addition to or instead of displaying characters. The occupant can permit automatic starting of the air conditioning device 126 at the scheduled time by pressing a reserve button 402. The occupant can change the scheduled time or the set temperature by pressing a change button 403. The occupant can cancel automatic starting of the air conditioning device 126 by pressing a cancel button 404.

Referring to FIG. 3 again, in step S306, the control device 110 determines whether automatic starting of the air conditioning device 126 is permitted. When the above condition is satisfied (YES in step S306), the control device 110 advances the processing to step S307, and when the above condition is not satisfied (NO in step S306), the control device 110 ends the processing.

In step S307, the control device 110 starts the air conditioning device 126 at the scheduled time. At this time, it may be necessary to start up the vehicle 120. In such a case, the control device 110 also controls other devices of the vehicle 120.

Figure 5:
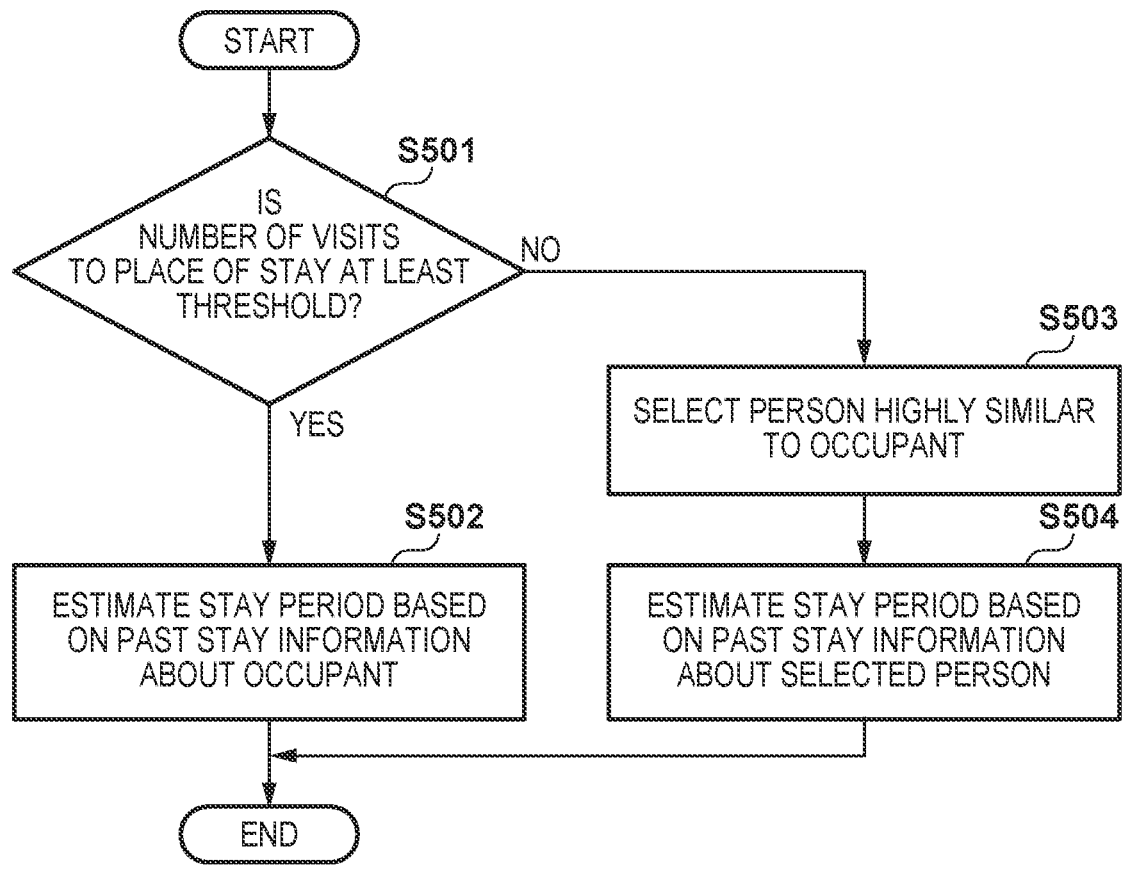
FIG. 5 is a flowchart for explaining an example of a stay period estimation method according to an embodiment.

The following describes details of step S302 (estimation of the stay period) in FIG. 3 with reference to FIG. 5. The control device 110 manages a database in which stay information about the user of the air conditioning control service is accumulated. The database is stored in the storage device 112, for example. The database is referred to as a stay information DB. The stay information DB includes records generated for each instance of travel (from getting into the vehicle to getting out of the vehicle) made by the user. Each record includes the following fields, for example.

Occupant ID: Information for identifying the occupant.

Place of departure: Place where the occupant got into the vehicle.

Place of stay: Place where the occupant got out of the vehicle.

Travel period: Period of time from when the occupant got into the vehicle to when the occupant got out of the vehicle.

Arrival time: Time when the vehicle arrived at the place of stay.

Stay period: Period of time from when the occupant got out of the vehicle to when the occupant got into the vehicle again.

Number of occupants: Number of occupants who traveled in the vehicle.

Driver's age: Age of the driver.

Driver's sex: Sex of the driver.

Existence of passenger: Presence or absence of a passenger.

Relationship between driver and passenger: The driver's relationship to any other occupant (for example, family or a colleague).

Vehicle type: Type of the vehicle (for example, a sedan or a station wagon).

Occupant capacity: Maximum number of occupants who can get into the vehicle.

Every time the user of the air conditioning control service gets out of the vehicle and gets into the vehicle again, the control device 110 collects the above information and updates the stay information DB.

In step S501, the control device 110 determines whether the number of visits to the place of stay by the occupant of the vehicle 120 is at least a specific threshold. When the above condition is satisfied (YES in step S501), the control device 110 advances the processing to step S502, and when the above condition is not satisfied (NO in step S501), the control device 110 advances the processing to step S503. The specific threshold is 10, for example.

In step S502, the control device 110 estimates the stay period based on past stay information about the occupant. The past stay information about the occupant can be acquired by referring to the stay information DB described above. For example, the control device 110 may estimate the stay period through statistical processing (for example, averaging) of stay periods at the place of stay based on past stay information about the occupant. The control device 110 may estimate the stay period by extracting a portion of past stay information about the same place of stay based on an attribute of the occupant or an attribute of the vehicle, and using that portion of the past stay information. For example, the stay period may be different between a case where the driver is alone at the place of stay and a case where the driver is there with his or her family. Therefore, when there is no occupant other than the driver, the control device 110 may estimate the stay period using information regarding cases where the driver was alone at the place of stay in the past. As for the case where there is a passenger, the stay period may vary depending on whether the passenger is family or a colleague. Therefore, the control device 110 may estimate the stay period based on an attribute of the passenger (relationship to the driver).

In step S503, the control device 110 selects a person who is highly similar to the occupant by referring to the stay information DB. The person selected in this step is used in estimation of the stay period in the next step. A person who is not the occupant is selected. The control device 110 may select the person based on at least either an attribute of the occupant or the number of occupants. It is considered that the stay period at the place of stay is similar between cases where an attribute (for example, age or sex) of the occupant is the same or between cases where the number of occupants is the same.

The control device 110 may select a person based on at least one of an attribute of the vehicle and a travel distance or a travel period from the place of departure of the vehicle to the place of stay. It is considered that the stay period at the place of stay is similar between cases where an attribute (for example, vehicle type or occupant capacity) of the vehicle is the same or between cases where the travel distance or the travel period is the same.

In step S504, the control device 110 estimates the stay period based on past stay information about the selected person. The past stay information about the selected person can be acquired by referring to the stay information DB described above. For example, the control device 110 may estimate the stay period through statistical processing (for example, averaging) of stay periods at the place of stay based on the past stay information about the selected person.

According to the above embodiment, the control device 110 proposes a start time of the air conditioning device 126 to the occupant. Therefore, the occupant is kept from forgetting to make a reservation to start the air conditioning device 126.

According to the above embodiment, the start time of the air conditioning device 126 is proposed. Alternatively, the present invention can be applied to other devices that are provided in the vehicle 120. For example, the present invention may be applied to an engine. By starting the engine before the occupant gets into the vehicle, a warm-up operation can be performed in advance. In another example, the present invention may be applied to a seat arrangement device. In the case where the place of stay of the vehicle 120 is a shopping mall, the control device 110 may suggest the occupant to recline a backseat in advance. In yet another example, the present invention may be applied to an opening and closing control device for a window. In an area where the risk of theft is low, it is possible to adjust the temperature of the interior of the vehicle by opening or closing the window rather than starting the air conditioning device. In a further example, the present invention may be applied to a steering wheel heater of the vehicle.

SUMMARY OF EMBODIMENT

First Configuration

A control device (110) that controls a device (126) provided in a vehicle (120), including:

starting means (S307) capable of starting the device;

identification means (S301) configured to identify a place of stay where an occupant of the vehicle spends time after getting out of the vehicle;

estimation means (S302) configured to estimate a stay period of the occupant at the place of stay; and determination means (S303) configured to determine, based on the stay period, a scheduled time at which the starting means is to start the device before the occupant gets into the vehicle.

According to this configuration, the occupant can be kept from forgetting to start a device such as an air conditioning device.

Second Configuration

The control device according to the first configuration, wherein the estimation means estimates the stay period based on information regarding a past stay of the occupant at the place of stay (S502).

According to this configuration, the stay period can be estimated based on a history of past stays of the occupant.

Third Configuration

The control device according to the first configuration, wherein the estimation means estimates the stay period based on information regarding a past stay of a person other than the occupant at the place of stay (S504).

According to this configuration, the stay period can be estimated based on a history of past stays of the person other than the occupant.

Fourth Configuration

The control device according to the first configuration, wherein, when the number of visits to the place of stay by the occupant is at least a threshold, the estimation means estimates the stay period based on information regarding a past stay of the occupant at the place of stay (S502), and when the number of visits to the place of stay by the occupant is smaller than the threshold, the estimation means estimates the stay period based on information regarding a past stay of a person other than the occupant at the place of stay (S504).

According to this configuration, the stay period can be estimated with high accuracy.

Fifth Configuration

The control device according to the third or fourth configuration, wherein the estimation means selects the person other than the occupant, who is used in estimation of the stay period, based on at least either an attribute of the occupant or the number of occupants (S503).

According to this configuration, the stay period can be estimated by using a history of cases that are selected based on similarity to the occupant of the vehicle.

Sixth Configuration

The control device according to the third or fourth configuration, wherein the estimation means selects the person other than the occupant, who is used in estimation of the stay period, based on at least any of an attribute of the vehicle and a travel distance or a travel period from a place of departure of the vehicle to the place of stay (S503).

According to this configuration, the stay period can be estimated by using a history of cases that are selected based on similarity to the attribute of the vehicle or a travel history.

Seventh Configuration

The control device according to any one of the first to sixth configurations, further including notification means (S304) configured to notify the occupant of the scheduled time.

According to this configuration, it is possible to notify the occupant of the scheduled time for starting the device.

Eighth Configuration

The control device according to the seventh configuration, wherein the notification means gives a notification of the scheduled time through an output device (124) provided in the vehicle.

According to this configuration, it is possible to give the notification of the scheduled time for starting the device while the occupant is in the vehicle.

Ninth Configuration

The control device according to the seventh configuration, wherein the notification means gives a notification of the scheduled time through an output device (134) of a mobile terminal (130) of the occupant.

According to this configuration, it is possible to give the notification of the scheduled time for starting the device while the occupant is out of the vehicle.

Tenth Configuration

The control device according to any one of the first to ninth configurations, further including means (S305) configured to accept a change made to the scheduled time by the occupant.

According to this configuration, the occupant can change the start time of the device.

Eleventh Configuration

The control device according to any one of the first to tenth configurations, wherein the starting means starts the device at the scheduled time (S307).

According to this configuration, the device can be started in the absence of the occupant.

Twelfth Configuration

The control device according to any one of the first to eleventh configurations, wherein the device is an air conditioning device.

According to this configuration, the air conditioning device can be started in the absence of the occupant.

Thirteenth Configuration

A method for controlling a device (126) provided in a vehicle (120), including:

identifying a place of stay where an occupant of the vehicle spends time after getting out of the vehicle (S301);

estimating a stay period of the occupant at the place of stay (S302); and determining, based on the stay period, a scheduled time for starting the device before the occupant gets into the vehicle (S303).

According to this configuration, the occupant can be kept from forgetting to start pre-air conditioning.

Fourteenth Configuration

A program that causes a computer to function as respective means of the control device according to any one of the first to twelfth configurations.

According to this configuration, the occupant can be kept from forgetting to start pre-air conditioning.

What is claimed is:

1. A control device for controlling a device provided in a vehicle, the control device comprising at least one processor circuit with a memory comprising instructions, that when executed by the processor circuit, cause the processor circuit to at least:
   identify a place of stay where an occupant of the vehicle spends time after getting out of the vehicle;
   estimate a stay period of the occupant at the place of stay;
   determine, based on the stay period, a scheduled time to start the device before the occupant gets into the vehicle; and
   start the device at the scheduled time,
   wherein, when a number of visits to the place of stay by the occupant is at least a threshold, the stay period is estimated based on information regarding a past stay of the occupant at the place of stay, and
   when the number of visits to the place of stay by the occupant is smaller than the threshold, the stay period is estimated based on information regarding a past stay of a person other than the occupant at the place of stay.

2. The control device according to claim 1,
   wherein the instructions, that when executed by the processor circuit, cause the processor circuit to estimate the stay period based on information regarding a past stay of the occupant at the place of stay.

3. The control device according to claim 1,
   wherein the instructions, that when executed by the processor circuit, cause the processor circuit to estimate the stay period based on information regarding a past stay of a person other than the occupant at the place of stay.

4. The control device according to claim 3,
   wherein the instructions that when executed by the processor circuit, cause the processor circuit to select the person other than the occupant, who is used in estimation of the stay period, based on at least any of: an attribute of the vehicle; and/or a travel distance or a travel period from a place of departure of the vehicle to the place of stay.

5. The control device according to claim 1,
   wherein the instructions, that when executed by the processor circuit, cause the processor circuit to
   notify the occupant of the scheduled time.

6. The control device according to claim 5,
   wherein the instructions, that when executed by the processor circuit, cause the processor circuit to give a notification of the scheduled time through an output device provided in the vehicle.

7. The control device according to claim 5,
   wherein the instructions, that when executed by the processor circuit, cause the processor circuit to give a notification of the scheduled time through an output device of a mobile terminal of the occupant.

8. The control device according to claim 1,
   wherein the instructions, that when executed b the processor circuit, cause the processor circuit to
   accept a change made to the scheduled time by the occupant.

9. The control device according to claim 1,
   wherein the device is an air conditioning device.

10. A method for controlling a device provided in a vehicle, the method comprising:
    identifying a place of stay where an occupant of the vehicle spends time after getting out of the vehicle;
    estimating a stay period of the occupant at the place of stay;
    determining, based on the stay period, a scheduled time to start the device before the occupant gets into the vehicle; and
    starting the device at the scheduled time,
    wherein, when a number of visits to the place of stay by the occupant is at least a threshold, the stay period is estimated based on information regarding a past stay of the occupant at the place of stay, and
    when the number of visits to the place of stay by the occupant is smaller than the threshold, the stay period is estimated based on information regarding a past stay of a person other than the occupant at the place of stay.

11. A non-transitory storage medium storing a program comprising instructions, that when executed by a processor circuit, cause the processor circuit to at least:
    identify a place of stay where an occupant of a vehicle spends time after getting out of the vehicle;
    estimate a stay period of the occupant at the place of stay;
    determine, based on the stay period, a scheduled time to start a device provided in the vehicle before the occupant gets into the vehicle; and
    start the device at the scheduled time,
    wherein, when a number of visits to the place of stay by the occupant is at least a threshold, the stay period is estimated based on information regarding a past stay of the occupant at the place of stay, and
    when the number of visits to the place of stay by the occupant is smaller than the threshold, the stay period is estimated based on information regarding a past stay of a person other than the occupant at the place of stay.

* * * * *